United States Patent [19]

Nagasawa

[11] Patent Number: 5,424,994
[45] Date of Patent: Jun. 13, 1995

[54] SEMICONDUCTOR MEMORY UNIT USED AS EXTERNAL STORAGE

[75] Inventor: Soichiro Nagasawa, Kawasaki, Japan

[73] Assignee: Fujitsu Limited, Kawasaki, Japan

[21] Appl. No.: 990,837

[22] Filed: Dec. 16, 1992

[30] Foreign Application Priority Data

Dec. 16, 1991 [JP] Japan .................. 3-331868

[51] Int. Cl.⁶ ............................................ G11C 11/40
[52] U.S. Cl. ...................... 365/229; 365/226; 365/227; 371/66
[58] Field of Search .............. 365/229, 228, 227, 226; 371/66; 364/707

[56] References Cited

U.S. PATENT DOCUMENTS 3,980,935  9/1976  Worst .................................. 365/229
5,204,963  4/1993  Noya et al. ........................ 365/229

FOREIGN PATENT DOCUMENTS

0187369   7/1986  European Pat. Off. .
2-19911   1/1990  Japan .
2-19912   1/1990  Japan .
3-58111   3/1991  Japan .
30058111  3/1991  Japan .

Primary Examiner—Joseph A. Popek
Assistant Examiner—Huan Hoang
Attorney, Agent, or Firm—Greer, Burns & Crain, Ltd.

[57] ABSTRACT

A semiconductor memory unit is operated by supplying an electric power from a system power source (200 v) used so as to be cut off at a predetermined time. The semiconductor memory unit includes a volatile memory for storing data that can be accessed by a host unit coupled to the semiconductor memory unit, a battery used as a back-up power source for the volatile memory, and a power supply controller, coupled to the system power source, the battery and an all-day service power source (100 v) having a capacity less than that of the system power source, for switching a power source by which electric power is supplied to the volatile memory from the system power source to the all-day service power source when the system power source is cut off, and for switching it from the all-day service power source to the battery when a service interruption of the all-day service power source occurs.

7 Claims, 6 Drawing Sheets

| STATE | POWER SUPPLY (A) (SYSTEM P.S.) | POWER SUPPLY (B) (ALL-DAY SERVICE) | POWER SUPPLY (C) (BATTERY) | VOLTAGE CONVERTER 59 | VOLTAGE CONVERTER 60 |
|---|---|---|---|---|---|
| 1 | ON | ON/OFF | ON/OFF | POWER SUPPLY (A) | POWER SUPPLY (A) |
| 2 | OFF | ON | ON/OFF | NO SUPPLY | POWER SUPPLY (B) |
| 3 | OFF | OFF | ON | NO SUPPLY | POWER SUPPLY (C) |

ON/OFF : DON'T CARE

Fig. 5B

| NO. | POWER SENSOR | | | SWITCHES | | | | OUTPUT OF VOLTAGE CONVERTER | |
|---|---|---|---|---|---|---|---|---|---|
| | 50 | 51 | 52 | S1 | S2 | S3 | S4 | 59 | 60 |
| 1 | 1 | * | * | CLOSE | CLOSE | OPEN | OPEN | ON (SYSTEM P.S.) | ON (SYSTEM P.S.) |
| 2 | 0 | 1 | * | OPEN | OPEN | CLOSE | OPEN | OFF | ON (ALL-DAY SERVICE P.S.) |
| 3 | 0 | 0 | 1 | OPEN | OPEN | OPEN | CLOSE | OFF | ON (BATTERY) |
| 4 | 0 | 0 | 0 | OPEN | OPEN | OPEN | OPEN | OFF | OFF |

SEMICONDUCTOR MEMORY UNIT USED AS EXTERNAL STORAGE

BACKGROUND OF THE INVENTION

(1) Field of the Invention

The present invention relates to a semiconductor memory unit, such as a semiconductor disk unit, used as an external storage unit.

(2) Description of Related Art

In a high performance and high speed computer system such as have been proposed recently, the performance of a CPU (Central Processing Unit) is being improved rapidly with development of the semiconductor technology. Thus, it is required to improve the performance of an external storage unit coupled to the computer system. In compliance with the above requirement, a semiconductor disk using a semiconductor memory device capable of being electrically accessed at a high speed has been proposed as an alternative to a magnetic disk unit accessed mechanically. Due to the development of recent semiconductor technology, the capacity of the semiconductor memory device can become large and the price thereof can be decreased.

However, when the power supplied to the semiconductor device is cut off, data stored therein normally disappears (volatility). Thus, in the semiconductor memory unit used as an external storage unit, it is required to provide ways for making the data not disappear (non-volatility).

To achieve the above requirement, a magnetic disk unit is coupled to the semiconductor memory unit. When the power is cut off, the data stored in the semiconductor is transferred therefrom to the magnetic disk, and when the power is again supplied to the semiconductor memory unit, the data stored in the magnetic disk is returned therefrom to the semiconductor memory unit. However, as large amounts of data can be stored in the semiconductor memory unit, a long time is needed to transfer the data from the semiconductor memory unit to the magnetic disk unit and vice versa. Thus, it is difficult to save the data when a service interruption occurs; furthermore, a long time is required to restart the computer system to which the semiconductor memory unit and the magnetic disk unit are coupled.

Accordingly, in a conventional semiconductor memory unit, a back-up power supply is provided to the semiconductor memory device so that when the service interruption occurs, the data stored in the semiconductor memory device is maintained.

Figure 1:
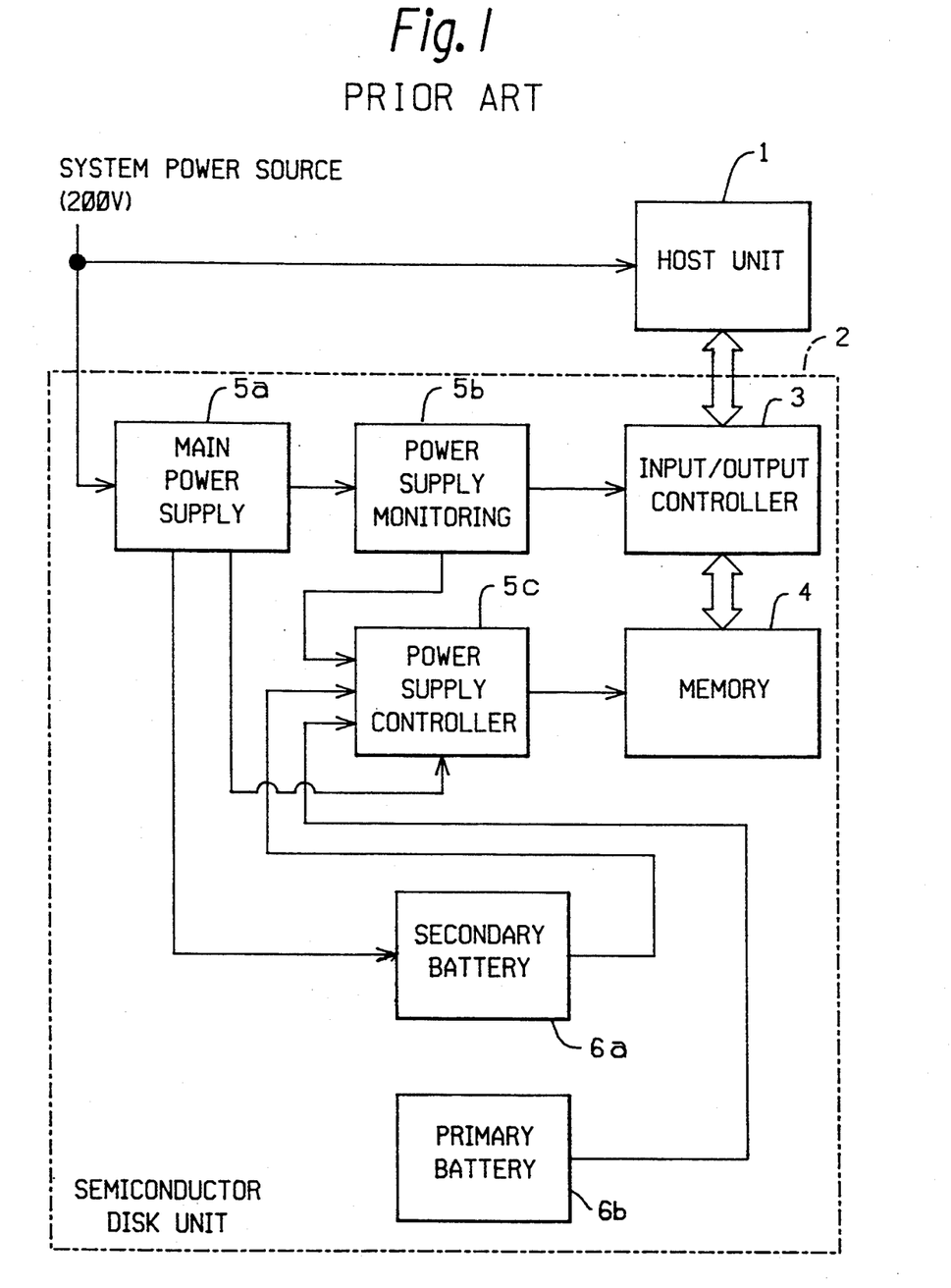
FIG. 1 is a block diagram illustrating a conventional semiconductor memory unit.

FIG.1 shows an example of a conventional semiconductor memory unit. The semiconductor memory unit shown in FIG.1 is a semiconductor disk unit.

Referring to FIG. 1, a semiconductor disk unit 2 is coupled to a host unit 1, and is used as an external storage unit. The semiconductor disk unit 2 includes a semiconductor memory portion 4 and an input/output controller 3. Data is stored in the semiconductor memory portion 4 in a format appropriate for a magnetic disk. The input/output controller 3 accesses the semiconductor memory portion 4 in accordance with instructions (e.g. a read/write command) supplied from the host unit 1 so that data read out from the semiconductor memory portion 4 is supplied to the host unit 1, and data output from the host unit 1 is written into the semiconductor memory portion 4. The semiconductor memory unit 2 is operatively coupled to a large-scale CPU in the host unit 1, and has a large capacity and high level functions.

Thus, the semiconductor memory portion 4 and the input/output controller 3 require a large amount of electric power. Thus, an electric power is supplied to the semiconductor memory unit 2 from the same system power source (e.g. 200 v) as the host unit 1 which also requires a large amount of electric power. The semiconductor memory portion 4 is formed of a DRAM (Dynamic Random Access Memory), enabling high speed operations. However, data stored in the DRAM disappears when the service interruption occurs. Thus, batteries are used as the back-up power source for the DRAM (Japanese Patent Laid-Open Application No. 3-58111).

That is, the semiconductor memory unit 2 is provided with a main power supply circuit 5a for converting an AC voltage (200 v) supplied from the system power supply into a DC voltage (5 v), a secondary battery 6a, and a primary battery 6b. The semiconductor memory unit 2 is further provided with a power monitoring circuit 5b and a power selecting circuit 5c. The power monitoring circuit 5b constantly monitors whether or not the system power source is cut off and does so based on the output voltage of the main power supply circuit 5a. The DC voltage output from the main power supply circuit 5a is normally supplied to the semiconductor memory portion 4 via the power selecting circuit 5c. When the power monitoring circuit 5b detects that the system supply is cut off, the power selecting circuit 5c selects the secondary and primary batteries 6a and 6b so that the DC voltage is supplied from the secondary and primary batteries 6a and 6b to the semiconductor memory portion 4.

Even if the service interruption occurs so that system power source is cut off, the system power source is normally restored shortly therafter. In addition, a relatively small amount of dissipation power is required to maintain the data stored in the semiconductor memory portion 4 (the required DRAM). Thus, the capacity of each of the secondary and primary batteries 6a and 6b may be relatively small.

However, there are the following disadvantages in the above conventional semiconductor memory unit 2.

The system power source is generally used for the computer system. Thus, when the computer system is deactivated, the large capacity systems power source, which supplies a great amount of electric current, is cut off for safety reasons. That is, the computer system is managed in an operation style such that the computer system is turned off during nights and other long periods of time, such as holidays, by cutting off the system power source. In this operation style, the back-up power must be supplied from the batteries 6a and 6b to the semiconductor memory portion 4 during the time the computer system is stopped. In a case where the computer system is stopped during the weekend, for example, the batteries 6a and 6b must supply the electric power to the semiconductor memory portion 4 for at least 48 hours. In this case, large capacity back-up batteries 6a and 6b are required in the semiconductor memory unit 2, so that the semiconductor memory unit 2 becomes large and expensive.

In addition, a small-sized computer system, such as a workstation and a personal computer, may be stopped for an even longer time. In this case, the back-up batteries must have an even larger capacity.

SUMMARY OF THE INVENTION

Accordingly, a general object of the present invention is to provide a novel and useful semiconductor memory unit to be used as an external storage unit in which the disadvantages of the aforementioned prior art are eliminated.

A more specific object of the present invention is to provide a semiconductor memory unit in which the electric power can be supplied to the semiconductor memory for a long time without a large capacity battery when the system power supply is cut off.

The above objects of the present invention are achieved by a semiconductor memory unit operated by supplying electric power from a first power source used so as to be cut off at a predetermined time. The semiconductor memory unit includes volatile memory means for storing data that can be accessed by a host unit coupled to the semiconductor memory unit. The volatile memory means maintains the data while an electric power is being supplied. A battery is provided as a back-up power source for the volatile memory means. Power supply control means are coupled to the first power source, the battery and a second power source that performs an electric power service all day and has a capacity less than that of the first power source. The power supply control means is used for switching a power source by which electric power is supplied to the volatile memory means from the first power source to the second power source when the first source is cut off, and for switching it from the second power source to the battery when a service interruption of the second power source occurs.

According to the present invention, when the first power supply is cut off, a power source by which the electric power is supplied to the volatile memory means is switched from the first power source to the second power source. The power back-up of the volatile memory means can be provided by the second power source for a long time without a large capacity battery. That is, the time for which the electric power is supplied from the battery to the volatile memory means is reduced, so that the capacity of the battery can be also reduced.

Additional objects, features and advantages of the present invention will become apparent from the following detailed description when read in conjunction with the accompanying drawings.

DESCRIPTION OF THE PREFERRED EMBODIMENTS

A description will now be given of the principle of an embodiment of the present invention with reference to FIG. 2.

Figure 2:
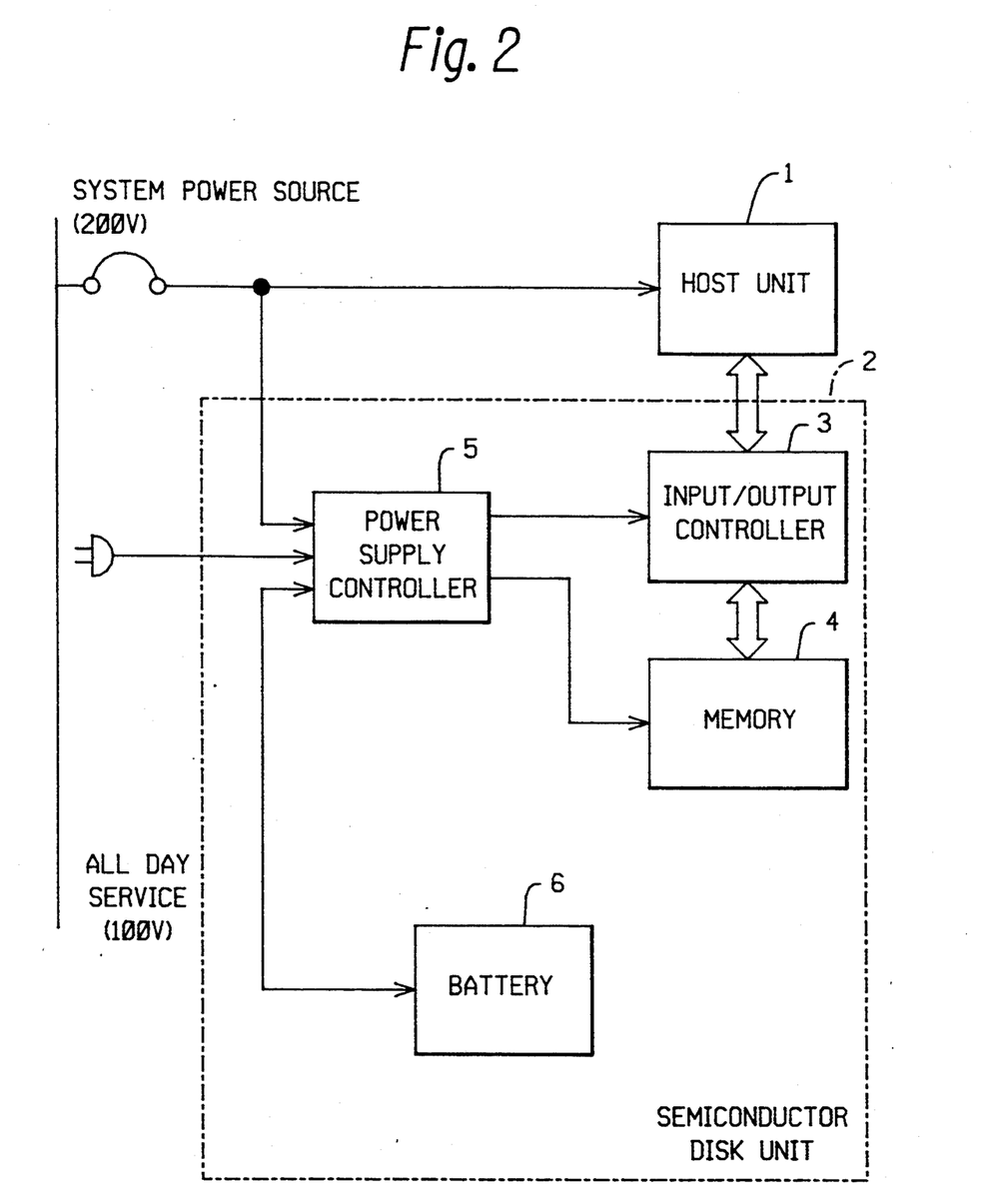
FIG. 2 is a block diagram illustrating an essential part of a semiconductor memory unit according to an embodiment of the present invention.

Referring to FIG. 2, a host unit 1 (a host computer) is coupled with a semiconductor memory unit 2 (e.g. a semiconductor disk unit). The electric power is supplied from a system power source (e.g. 200 v) to the host unit 1. The system power source has a large capacity (e.g. in the range between few hundred amperes and few thousands amperes). The semiconductor memory unit 2 includes an input/output controller 3, a volatile semiconductor memory 4, a power supply controller 5 and a battery 6. The input/output controller 3 performs the input/output controlling of 5 data between the host unit 1 and the semiconductor memory 4. The semiconductor memory unit 2 is connected to the system power source and to an all-day service power source (e.g. 100 v). The all-day service power source can be used for the semiconductor memory all day. The capacity of the all-day service power source is a few tens of amperes less than that of the system power source. The power supply controller 5 selects either the system power source or the all-day service power source or the battery 6, and the electric power is supplied from the selected power source to the input/output controller 3 and the semiconductor memory 4 via the power supply controller 5.

The electric power is normally supplied from the system power source to the semiconductor memory unit 2. When the system power source is cut off along with the shutting down of the host unit 1, the power supply controller 5 detects that the system power source is cut off and selects the all-day service power source. As a result, the electric power is supplied from the all-day service power source to the semiconductor memory 4 via the power supply controller 5. Thus, even if the system power source is cut off, electric power is continuously supplied to the semiconductor memory 4 and the data stored in the semiconductor memory 4 is maintained. Further, when service interruption occurs so that both the system power source and the all-day service power source are cut off, the power supply controller 5 selects the battery 6. In this case, electric power is continuously supplied from the battery 6 to the semiconductor memory 4.

A description will now be given of an embodiment of the present invention with reference to FIGS. 3-5B.

Figure 3:
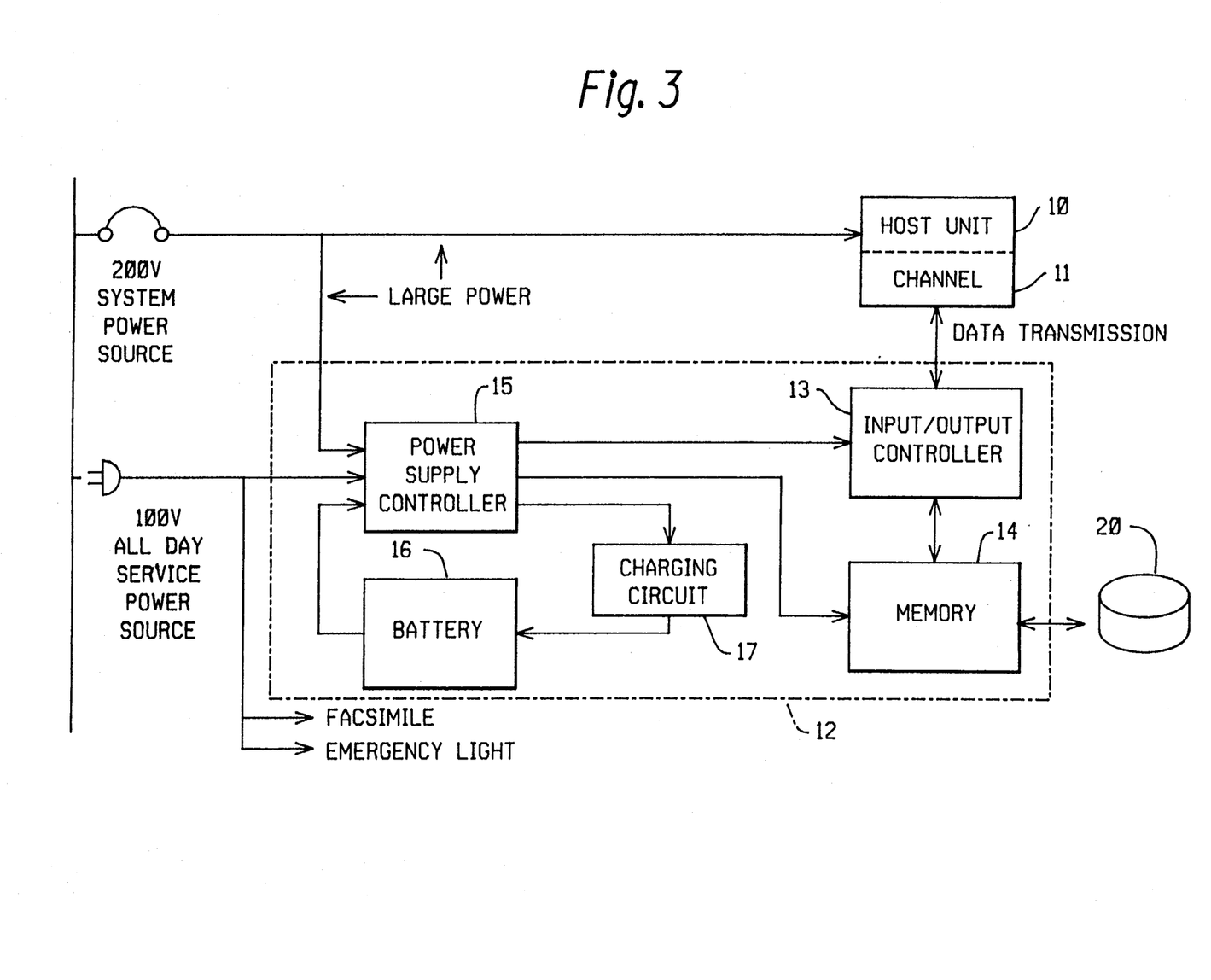
FIG. 3 is a block diagram illustrating the semiconductor memory unit according to the embodiment of the present invention.

Referring to FIG. 3, which shows a computer system, a host unit 10 (a host computer) has a channel 11 and is connected with the system power source (A) (200 v) enabling a supply of high electric power. A semiconductor disk unit 12 includes an input/output controller coupled to the host unit 10 via the channel 11, a semiconductor memory 14 accessed by the input/output controller 13, a power supply controller 15, a battery 16 (a secondary battery) and a charging circuit 17. The semiconductor memory 14 stores data in accordance with a magnetic disk format. The system power source (A), an all-day service power source (B), and the battery 16 (a back-up DC power source (C)) are coupled to the power supply controller 15. The power supply controller 15 selects either the system power source (A), the all-day service power source (B) or the battery 16, and the electric power is supplied from the selected power source to the input/output controller 13 and the semiconductor memory 14 via the power supply controller 15. The electric power output from the power supply controller 15 is also supplied to the charging circuit 17, and the charging circuit 17 charges the battery 16. The semiconductor memory 14 is formed of a DRAM, and is coupled to a magnetic disk unit 20. The semiconductor disk unit 12 is always provided with electric power from the all-day service power source (B). Other equipments, such as facsimile machines and emergency lights, are also provided with the electric power from the all-day service power source (B).

Figure 4:
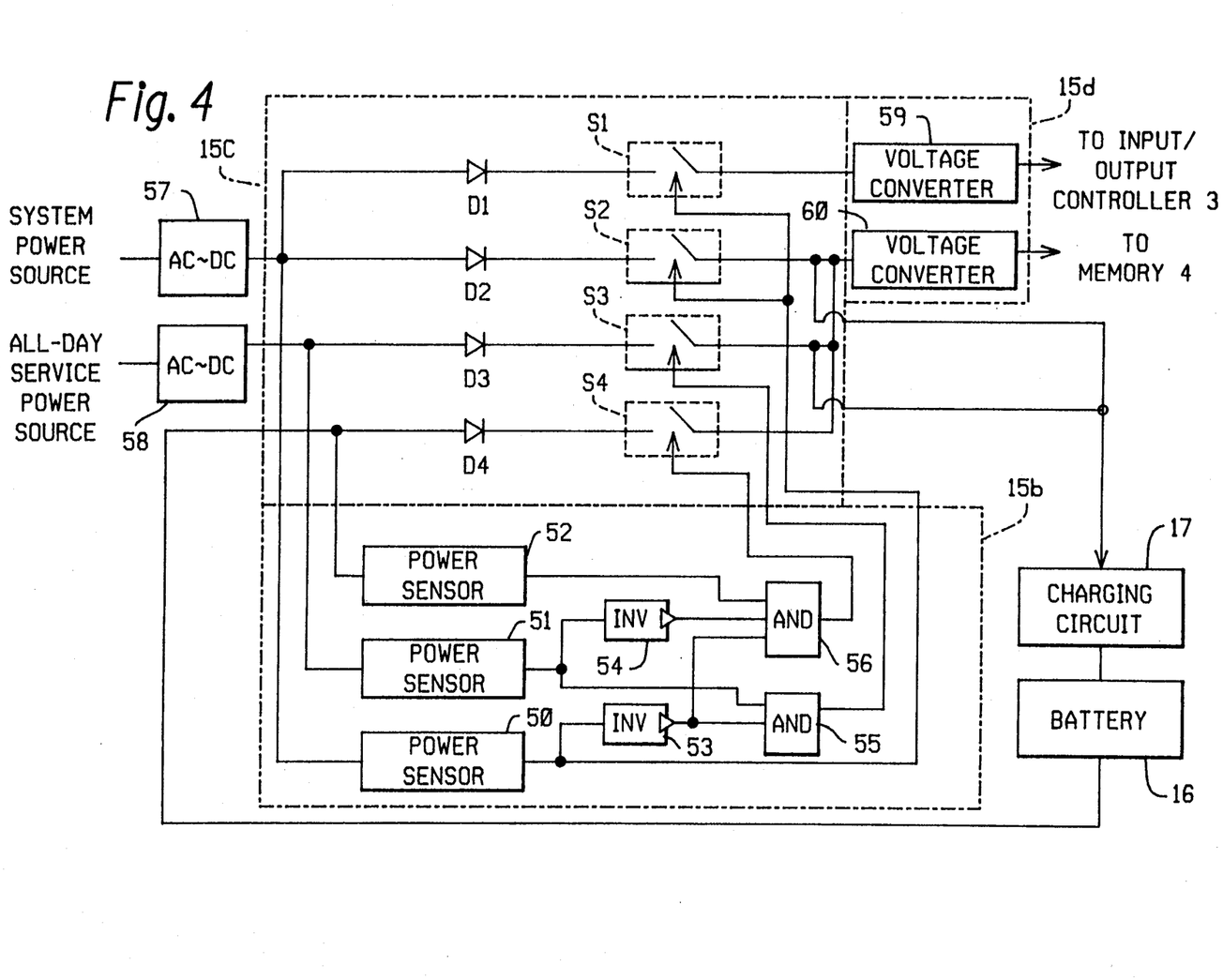
FIG. 4 is a block diagram illustrating a power supply controller shown in FIG. 3.

The power supply controller 15 is formed as shown in FIG. 4. Referring to FIG. 4, the power supply controller 15 includes an AC-to-DC converter 57 coupled to the system power source (A), an AC-to-DC converter 58 coupled to the all-day service power source (B), a power monitoring circuit 15b, a switching circuit 15c and a voltage stabilizer 15d. The AC-to-DC converter 57 converts an AC voltage (200 v) supplied from the system power source (A) into a DC voltage (5 v). The AC-to-DC converter 58 converts an AC voltage (100 v) supplied from the all-day service power source (B) into a DC voltage (5 v).

The power monitoring circuit 15b includes a first power sensor 50 connected to the AC-to-DC converter 57, a second power sensor 51 connected to the AC-to-DC converter 58, a third power sensor 52 connected to the battery 16, inverters 53 and 54, and AND gates 55 and 56. The first power sensor 50 detects whether or not the system power source (A) is cut off based on the output voltage of the AC-to-DC converter 57, and outputs a first detection signal activated when the system power source (A) is not cut off. The second power sensor 51 detects whether or not the all-day service power source (B) is cut off based on the output voltage of the AC-to-DC converter 58, and outputs a second detection signal activated when the all-day service power source (B) is not cut off. The third power sensor 52 detects whether or not electric power is being supplied from the battery 16, and outputs a third detection signal activated when the battery 16 supplies a sufficient electric power. The first detection signal output from the first power sensor 50 is input, via the inverter 53, to the AND gate 55. The second detection signal output from the second power sensor is also input to the AND gate 55. The first and second detection signals output from the first and second power sensors 50 and 51 are input, respectively, via the inverters 53 and 54 to the AND gate 56. The third detection signal output from the third power sensor 52 is input to the AND gate 56.

The switching circuit 15c includes a first switch S1, a second switch S2, a third switch S3, a fourth switch S4 and diodes D1, D2, D3 and D4 for cutting off backward currents. The first and second switches S1 and S2 are connected with the AC-to-DC converter 57 respectively via diodes D1 and D2. The third switch S3 is connected with the AC-to-DC converter 58 via a diode D3. The fourth switch S4 is connected to the battery 16 via a diode D4. The first and second switches S1 and S2 are provided with, as a control signal, the first detection signal output from the first power sensor 50, and are opened or closed in accordance with the state of the first detection signal. The third switch S3 is provided with, as a control signal, the output signal of the AND gate 55, and is opened or closed in accordance with the state of the output signal of the AND gate 55. The fourth switch S4 is provided with, as a control signal, the output signal of the AND gate 56, and is opened or closed in accordance with the state of the output signal of the AND gate 56.

The voltage stabilizer 15d includes a first voltage converter 59 (a DC-DC converter) and a second voltage converter 60 (a DC-DC converter). The first voltage converter 59 is coupled with the AC-to-DC converter 57 via the diode D1 and the first switch S1. The second voltage converter 60 is coupled with the AC-to-DC converter 57 via the diodes D2 and the second switch S2, and with the AC-to-DC converter 58 via the diode D3 and the third switch S3 and with the battery 16 via the diode D4 and the fourth switch S4. The first and second voltage converters 59 and 60 carry out constant voltage control of voltages supplied thereto and output constant DC voltages. The DC voltages output from the first and second voltage converters 59 and 60 are respectively supplied to the input/output controller 13 and the semiconductor memory 14.

Operations of the semiconductor disk unit 12 will be described below with reference to FIGS. 5A and 5B.

Figure 5A:
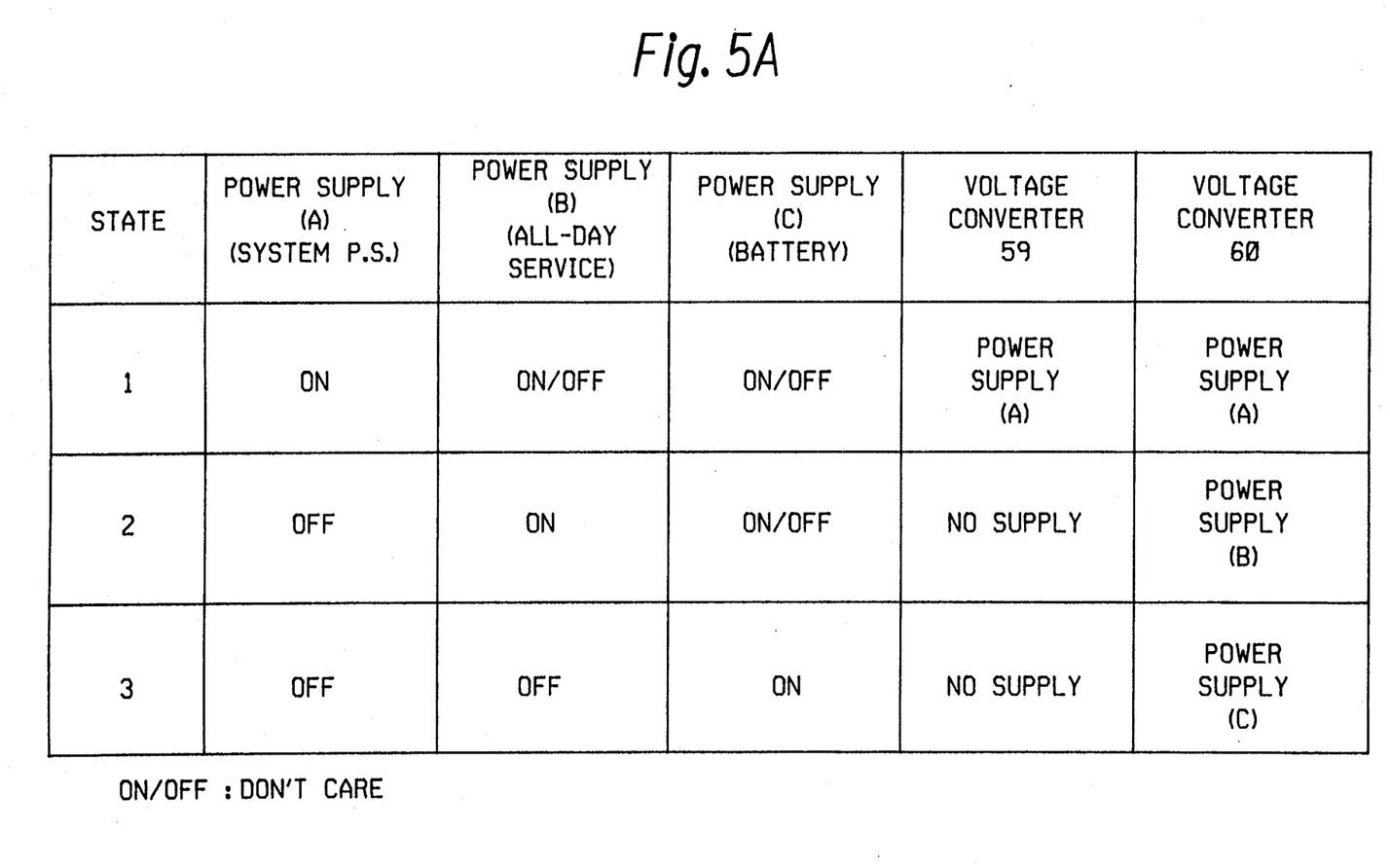
FIGS. 5A and 5B are tables illustrating operations of the power supply controller.
Figure 5B:
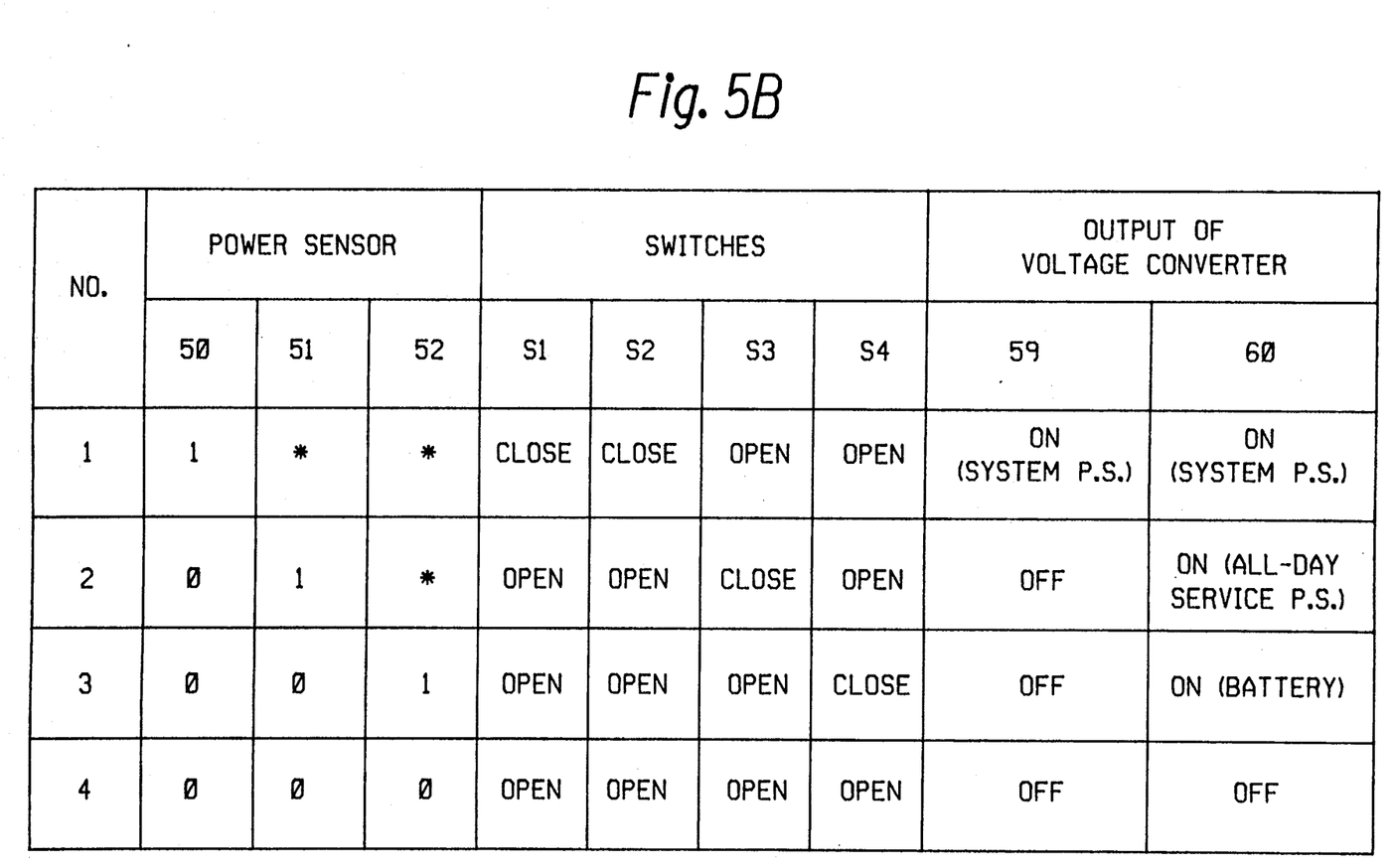

Electric power is supplied to the semiconductor disk unit 12 normally in a state (1) shown in FIG. 5A. In this state (1), the power supply monitoring circuit 15b operates as shown in row No. 1 of FIG. 5B. That is, the electric power is supplied from the system power source (A) to the semiconductor disk unit 12, and the first detection signal output from the first power sensor 50 is activated "1". Due to the activated first detection signal, the switches S1 and S2 are closed, and the DC voltage output from the AC-to-DC converter 57 coupled to the system power source (A) is supplied to both the first and second voltage converters 59 and 60 respectively via the switches S1 and S2. That is, the semiconductor memory 14 and the input/output controller 13 are provided with electric power from the system power source (A). In this case, the activated first detection signal output from the first power sensor 50 is inverted by the inverter 53 and is supplied to both the AND gates 55 and 56. Thus, the output signals output from the AND gates 55 and 56 are inactive, so that the switches S3 and S4 are closed. As a result, neither the AC-to-DC converter 58 nor the battery 16 supplies the voltage to the voltage stabilizer 15d. In addition, the voltage output from the AC-to-DC converter 57 is supplied to the charging unit 17, so that the battery 16 is charged by the charging circuit 17.

When the host unit 10 (the computer system) is shut down for a holiday or for a night, the system power source (A) is cut off. In this case, the electric power is supplied to the semiconductor disk unit 12 in a state (2) shown in FIG. 5A. In this state (2), the power supply monitoring circuit 15b operates as shown in row No. 2 of FIG. 5B. That is, the first detection signal output from the first power sensor 50 is inactive "0", and the second detection signal output from the second power sensor 51 is activated "1" due to the electric power supplied from the all-day service power source (B). As a result, the output signal from the AND gate 55 is activated "1". Due to the activated output signal from the AND gate 55, the switch S3 is closed, and the DC voltage output from the AC-to-DC converter 58 coupled to the all-day service power source (B), is supplied to the second voltage converter 60 via the switch S3. That is, only the semiconductor memory 14, through the voltage converter, and the charging circuit 17 are provided with the electric power from the all-day service power source (B). In this case, as the activated second detection signal output from the second power sensor 51 is inverted by the inverter 54, the output signal from the AND gate 56 is inactive, and the switch S4 is opened. Thus, the voltage output from the battery 16 is not supplied to the voltage stabilizer 15d. In addition, the voltage output from the AC-to-DC converter 58 is supplied to the charging circuit 17, so that the battery 16 is charged by the charging circuit 17.

In the above state (2), as the system power source (A) is cut off, neither the host unit 1 nor the input/output controller 13 in the semiconductor disk unit 12 is provided with electric power. Thus, in a state where the system is shut down, only the semiconductor memory 14 is provided with electric power, and the data stored in the semiconductor memory 14 is maintained.

Further, when service interruption of the all-day service power source (B) occurs, electric power is supplied from neither the system power source (A) nor the all-day service power source (B) to the semiconductor disk unit 12. In this case, electric power is supplied to the semiconductor disk unit 12 in a state (3) shown in FIG. 5A. In this state (3), the power source monitoring circuit 15b operates as shown in row No. 3 of FIG. 5B. That is, both the first and second detection signals, respectively, output from the first and second power sensors 50 and 51, are inactive, and only the third detection signal output from the third power sensor 52 is activated. Thus, the switches S1, S2 and S3 are opened, and only the switch S4 is closed. The electric power is supplied from the battery 16 (the back-up power source (C)) to the second voltage converter 60, the output voltage from the second voltage converter 60 is supplied to the semiconductor memory 14. As a result, even if both the system power source (A) and the all-day service power source (B) are cut off, due to the electric power supply from the battery 16 (the back-up power source (C)), the data stored in the semiconductor memory 14 is maintained.

Service interruption of the all-day service power source (B) is normally restored within two hours. Thus, it is sufficient to provide the battery 16 of a capacity sufficient for enabling to continuously supply electric power to the semiconductor memory 14 for four hours.

However, if service interruption of the all-day service power source continues for a long time more than four hours, neither the system power source (A), the all-day service power source (B), nor the battery 16 (the back-up power source (C)) supplies electric power to the semiconductor disk unit 12. In this case, the power supply monitoring circuit 15b operates as shown in a row (4) of FIG. 5B. That is, all the first, second and third detection signals respectively output from the first, second and third power sensors 50, 51 and 52, are inactive "0", and all the switches S1–S4 are opened. Thus, neither the input/output controller 13 nor the semiconductor memory 14 is provided with electric power, so that the data stored in the semiconductor memory 14 is lost. The capacity of the battery 16, however, can be determined based on a time slightly longer than that for which the service interruption of all-day service power source normally lasts.

According to the above embodiment, even if the system power source (A) is cut off for a night or a weekend, the semiconductor memory 14 is provided with electric power from the all-day service power source (B) instead of the system power source (A). That is, the battery 16 does not need to supply the electric power to the semiconductor memory 14 when the system power source (A) is cut off. The battery 16 may supply electric power to the semiconductor memory 14 only when the service interruption of the all-day service power source (B) occurs. Service interruption of the all-day service power source can normally be restored within a short time. Thus, the capacity of the battery used as the back-up power source for the semiconductor memory 14 can be reduced.

When maintenance of this system is needed, the data stored in the semiconductor memory 14 is transferred to the magnetic disk unit 20.

The host unit 10 may be a large-sized computer, a small-sized computer, a work station, a personal computer or the like.

The semiconductor memory unit according to the present invention is not limited to the semiconductor disks unit 12 as has been described above. The present invention may be applied to various types of semiconductor memory units.

The battery 16 may be a primary battery, and a set of the secondary batteries and the primary batteries can be provided, as the back-up battery for the semiconductor memory 14 in the semiconductor disk unit 12.

The present invention is not limited to the aforementioned embodiments, and variation and modifications may be made without departing from the scope of the claimed invention.

What is claimed is:

1. A semiconductor memory unit operated by supplying electric power from a first power source, used so as to be cut off at a predetermined time, said semiconductor memory unit comprising:

volatile memory means for storing data that can be accessed by a host unit coupled to said semiconductor memory unit, said volatile memory means maintaining the data while electric power is being supplied;

a battery used as a back-up power source for said volatile memory means;

a second power source, said second power source being available continuously when there is no service interruption of said second power source; and power supply control means, coupled to said first power source, said battery and said second power source for switching a power source by which electric power is supplied to said volatile memory means from said first power source to said second power source when said first power source is cut off, and for switching electric power from said second power source to said battery when a service interruption of said second power source occurs, said power supply control means including first detection means for detecting whether or not said first power source is cut off, second detection means for detecting whether or not service interruption of said second power occurs, and selecting means for selecting the power source by which electric power is supplied to said volatile memory means from among said first and second power sources and said battery based on results obtained by said first detection means and said second detection means, said selecting means including first means for selecting said first power source when said first detection means detects that said first power source is not cut off, second means for selecting said second power source when said first detection means detects that said first power source is cut off, and third means for selecting said battery when said first detection means detects that said first power source is cut off and said second detection means detects that service interruption of said second power source occurs.

2. A semiconductor memory unit as claimed in claim 1, wherein said semiconductor memory unit is a semiconductor disk unit in which data is stored in said volatile memory means in accordance with a magnetic disk format.

3. A semiconductor memory unit as claimed in claim 1 wherein said battery is a rechargeable battery.

4. A semiconductor memory unit as claimed in claim 1, wherein an all-day service power source supplying electric power to other equipment to be activated all day is used as said second power source.

5. A semiconductor memory unit operated by supplying electric power from an independent power source, used so as to be cut off at a predetermined time, said semiconductor memory unit comprising:
   a volatile memory;
   a system power source;
   an all day power source;
   a battery; and
   a power supply controller, said controller selectively connecting said system power source, said all day power source and said battery to said volatile memory.

6. A semiconductor memory unit as claimed in claim 5, wherein said power supply controller includes:
   a first power sensor having an input connected to said system power source;
   a second power sensor having an input connected to said all day power source;
   a third power sensor having an input connected to said battery;
   a charging circuit connected to an input of said battery;
   a first switch disposed between said system power source and said volatile memory and said charging circuit, said first switch being operatively connected to an output of said first power sensor;
   a second switch disposed between said all day power source and said volatile memory and said charging circuit, said second switch being operatively connected to an output of said second power sensor; and
   a third switch disposed between said battery and said volatile memory, said third switch being operatively connected to an output of said third power sensor.

7. A semiconductor memory as claimed in claim 6, wherein:
   said operative connections of said first, second, and third power sensors to said first, second, and third switches are formed by an array of logic gates; and
   said array operates said first, second, and third switches based on the outputs of said first, second, and third power sensors to connect said all day power source to said volatile memory and said charging circuit when said first sensor detects that said system power source is off, and to connect said battery to said volatile memory when said first sensor detects that said system power source is off and said second sensor detects that said all day power source is off.

* * * * *

UNITED STATES PATENT AND TRADEMARK OFFICE
CERTIFICATE OF CORRECTION

PATENT NO. : 5,424,994
DATED : June 13, 1995
INVENTOR(S) : Nagasawa

It is certified that error appears in the above-indentified patent and that said Letters Patent is hereby corrected as shown below:

Column 4, line 11, after "of" delete --5--.

Signed and Sealed this

Twenty-ninth Day of April, 1997

Attest:

BRUCE LEHMAN

Attesting Officer     Commissioner of Patents and Trademarks